(12) United States Patent
Kondo et al.

(10) Patent No.: US 10,565,231 B2
(45) Date of Patent: Feb. 18, 2020

(54) PERFORMANCE ADJUSTER FOR WEB APPLICATION SERVER AND RELATIONAL DATABASE SYSTEM

(71) Applicant: International Business Machines Corporation, Armonk, NY (US)

(72) Inventors: Hirotsugu Kondo, Chiba (JP); Naoko Nishiura, Chiba (JP); Atsushi Noguchi, Chiba (JP); Kumi Ohno, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/623,527

(22) Filed: Jun. 15, 2017

(65) Prior Publication Data

US 2018/0365308 A1 Dec. 20, 2018

(51) Int. Cl.
G06F 17/30 (2006.01)
G06F 16/27 (2019.01)
G06F 16/28 (2019.01)
G06F 16/951 (2019.01)

(52) U.S. Cl.
CPC .......... G06F 16/275 (2019.01); G06F 16/284 (2019.01); G06F 16/951 (2019.01)

(58) Field of Classification Search
CPC .... G06F 16/275; G06F 16/245; G06F 16/951; G06F 16/284; G06F 16/178; G06F 16/1787; G06F 16/1794; G06F 16/23; G06F 16/235; G06F 16/2358; G06F 16/2379; G06F 16/27; H04L 47/10; H04L 47/2483; H04L 47/25; H04L 45/02

See application file for complete search history.

(56) References Cited

U.S. PATENT DOCUMENTS

| 6,263,361 | B1 * | 7/2001 | Hoyer | G06F 11/3452 |
| | | | | 709/203 |
| 8,397,088 | B1 * | 3/2013 | Ghose | H04L 69/329 |
| | | | | 713/300 |
| 9,935,812 | B1 * | 4/2018 | Cirne | G06F 11/3409 |

(Continued)

OTHER PUBLICATIONS

IBM Knowledge Center—Intelligent Management: overview; https://www.ibm.com/support/knowledgecenter/SSAW57_8.5.5/com.ibm.websphere.nd.doc/ae/cwve_xdovrvw.html; printed Aug. 30, 2016; 2 pages.

(Continued)

*Primary Examiner* — Greta L Robinson
(74) *Attorney, Agent, or Firm* — Aaron N. Pontikos (57) ABSTRACT

A performance adjuster for an application server and a relational database system that uses a service class configuration information synchronizer coupled between the application server and the relational database to update the relational database with server class configuration information stored in the application server. A performance data collector and analyzer is coupled between the application server and the relational database to collect application server performance data. A performance controller is coupled between the application server and the relational database, and to the performance data collector and analyzer, to obtain the collected performance data and change flow rates in the application server and the relational database if the collected performance data does not meet a predetermined threshold.

18 Claims, 10 Drawing Sheets

(56) References Cited

U.S. PATENT DOCUMENTS

| | | |
|---|---|---|
| 2004/0088405 A1* | 5/2004 | Aggarwal ............. H04L 41/069 709/224 |
| 2006/0123010 A1* | 6/2006 | Landry ................... G06F 16/25 |
| 2012/0102171 A1 | 4/2012 | Bhatt et al. |
| 2012/0185441 A1 | 7/2012 | Sankar et al. |
| 2012/0185732 A1 | 7/2012 | Sankar et al. |
| 2019/0163842 A1* | 5/2019 | Pal ........................ G06F 16/904 |

OTHER PUBLICATIONS

IBM Knowledge Center—Implementation of DB2 workload management; https://www.ibm.com/support/knowledgecenter/SSH2TE_1.1.0/com.ibm.7700.r2.user.doc/doc/wlm-setup.html; printed Aug. 30, 2016; 1 page.

* cited by examiner

| | PREDEFINITION | | PERFORMANCE CONTROL VALUE | | PERFORMANCE DATA | | | | | | | |
|---|---|---|---|---|---|---|---|---|---|---|---|---|
| SC NAME | TARGET RESPONSE TIME | PRIORITY (10 LEVELS) | CURRENT SET VALUE OF HTTP FLOW RATE | CURRENT SET VALUE OF SQL FLOW RATE | AVERAGE HTTP RESPONSE TIME | AVERAGE SQL RESPONSE TIME | MEASURED VALUE OF HTTP FLOW RATE | MEASURED VALUE OF SQL FLOW RATE | AS CPU USAGE RATE | AMOUNT OF AS MEMORY USAGE | DB CPU USAGE RATE | AMOUNT OF DB MEMORY USAGE | AMOUNT OF DB DISK USAGE (INCREMENT) |
| SC-A | 1 SECOND | 10 | 30 | 20 | 1.2 SECONDS | 1.1 SECONDS | 30 | 20 | 5.5% | 220MB | 7.0% | 34MB | 2.0MB |
| SC-B | 2 SECONDS | 3 | 10 | 5 | 3.0 SECONDS | 1.8 SECONDS | 10 | 5 | 3.2% | 170MB | 4.5% | 72MB | 3.5MB |
| SC-C | 5 SECONDS | 8 | 20 | 20 | 4.5 SECONDS | 3.8 SECONDS | 18 | 18 | 11.3% | 310MB | 12.5% | 22MB | 1.7MB |
| SC-D | 10 SECONDS | 5 | 40 | 35 | 8.0 SECONDS | 6.2 SECONDS | 40 | 35 | 2.5% | 75MB | 8.7% | 11MB | 5.3MB |
| TOTAL | | | 100 | 80 | | | | | 22.5% | 775MB | 22.7% | 139MB | 12.5MB |
| PREDEFINED THRESHOLD VALUE | PREDEFINITION | | 300 | 200 | (SQL PERCENTAGE WITHIN RESPONSE TIME) 100% | | | | 70% | 1200MB | 50% | 500MB | 300MB |

PERFORMANCE ADJUSTER FOR WEB APPLICATION SERVER AND RELATIONAL DATABASE SYSTEM

BACKGROUND

The present invention relates to enterprise software and, more specifically, to performance adjusting in application and integration middleware.

Conventional web application servers, such as IBM® Websphere® Application Server (WAS), and relational database system, such as IBM® DB2 relational database management system, have performance adjusters that recognize events that affect routing and provide statistics to user for manual adjusting of performance. For example, in the case of WAS, the performance adjuster is referred to as Intelligent Management and in the case of relational database, the performance adjuster is referred to as Workload Manager. In order to make these adjusters work as a single system, however, the functions of each performance adjuster must be configured separately, which can be a burdensome task. While existing adjusters can obtain performance data during operation and dynamically use the data in performance adjustment, there is no coordination of performance data or coordination in performance adjustment between them. For example, conventional approaches cannot obtain a SQL processing time in the web side and use it for performance adjustment on the database side. Thus, there is a need in the art for more autonomous configuration of system architecture in a cloud environment and subsequent sharing of configuration information during operation.

SUMMARY

In one embodiment of the invention is a performance adjuster for a system having an application server and a relational database including a service class configuration information synchronizer coupled between the application server and the relational database and configured to update the relational database with server class configuration information stored in the application server, a performance data collector and analyzer coupled between the application server and the relational database and configure to collect application server performance data from the application server and relational database performance data from the relational database, and a performance controller coupled between the application server and the relational database and to the performance data collector and analyzer. The performance controller is configured to obtain the collected performance data from the performance data collector and analyzer and to change flow rates in the application server and the relational database if the collected performance data does not meet a predetermined threshold. The service class configuration information synchronizer is in communication with an application server service class configuration manager of the application server and with a relational database service class configuration manager of the relational database. The application server includes an application server service class configuration information manager configured to update configuration information in the application server in response to the service class configuration information synchronizer and the relational database includes a relational database service class configuration information manager configured to update configuration information in the relational database in response to the service class configuration information synchronizer. The application server further includes a HTTP request queue manager that updates an application server queue in response to configuration information received from the service class configuration information synchronizer. The application server further includes a SQL request queue manager that updates a relational database queue in response to configuration information received from the service class configuration information synchronizer. The application server performance data comprises HTTP response times and the relational database performance data comprise SQL response times. The flow rates in the application server and the relational database are based, at least in part, on the HTTP response times and the SQL response times Another embodiment of the invention is a method of adjusting the performance of a system having an application server and a relational database, comprising coupling a service class configuration information synchronizer between the application server and the relational database, using the service class configuration information synchronizer to update the relational database with server class configuration information stored in the application server, coupling a performance data collector and analyzer between the application server and the relational database, collecting application server performance data from the application server and relational database performance data from the relational database, coupling a performance controller between the application server and the relational database and to the performance data collector and analyzer, using the performance controller to obtain the collected performance data from the performance data collector and analyzer, and changing flow rates in the application server and the relational database if the collected performance data from the performance data collector and analyzer does not meet a predetermined threshold. Coupling of the service class configuration information synchronizer involves placing the service class configuration information synchronizer in communication with an application server service class configuration manager of the application server and with a relational database service class configuration manager of the relational database. An application server service class configuration information manager in the application server is configured to update configuration information in the application server in response to the service class configuration information synchronizer and including a relational database service class configuration information manager in the relational database that is configured to update configuration information in the relational database in response to the service class configuration information synchronizer. A HTTP request queue manager updates an application server queue in the application server and is configured to response to configuration information received from the service class configuration information synchronizer. An SQL request queue manager in the relational database is configured to update a relational database queue in response to configuration information received from the service class configuration information synchronizer. The flow rates in the application server and the relational database are changed if the collected performance data from the performance data collector and analyzer does not meet a predetermined threshold comprises determining HTTP response times and SQL response times are sufficient.

A further embodiment of the invention is a computer program product for adjusting the performance of a system having an application server and a relational database, the computer program product comprising a computer readable storage medium having program instructions embodied therewith, the program instructions executable by a computing device to cause the computing device to couple a service class configuration information synchronizer between the application server and the relational database, use the service class configuration information synchronizer to update the relational database with server class configuration information stored in the application server, couple a performance data collector and analyzer between the application server and the relational database, collect application server performance data from the application server and relational database performance data from the relational database, couple a performance controller between the application server and the relational database and to the performance data collector and analyzer, use the performance controller to obtain the collected performance data from the performance data collector and analyzer, and change flow rates in the application server and the relational database if the collected performance data from the performance data collector and analyzer does not meet a predetermined threshold. The application server includes an application server service class configuration information manager configured to update configuration information in the application server in response to the service class configuration information synchronizer and the relational database includes a relational database service class configuration information manager configured to update configuration information in the relational database in response to the service class configuration information synchronizer. The service class configuration information synchronizer is in communication with an application server service class configuration manager of the application server and with a relational database service class configuration manager of the relational database. The application server includes an application server service class configuration information manager that is configured to update configuration information in the application server in response to the service class configuration information synchronizer and the relational database includes a relational database service class configuration information manager that is configured to update configuration information in the relational database in response to the service class configuration information synchronizer. An HTTP request queue manager is configured to update an application server queue in the application server in response to configuration information received from the service class configuration information synchronizer. An SQL request queue manager in the relational database is configured to update a relational database queue in response to configuration information received from the service class configuration information synchronizer. Flow rates are changed in the application server and the relational database if the collected performance data from the performance data collector and analyzer does not meet a predetermined threshold comprises determining HTTP response times and SQL response times are sufficient.

DETAILED DESCRIPTION

Figure 1:
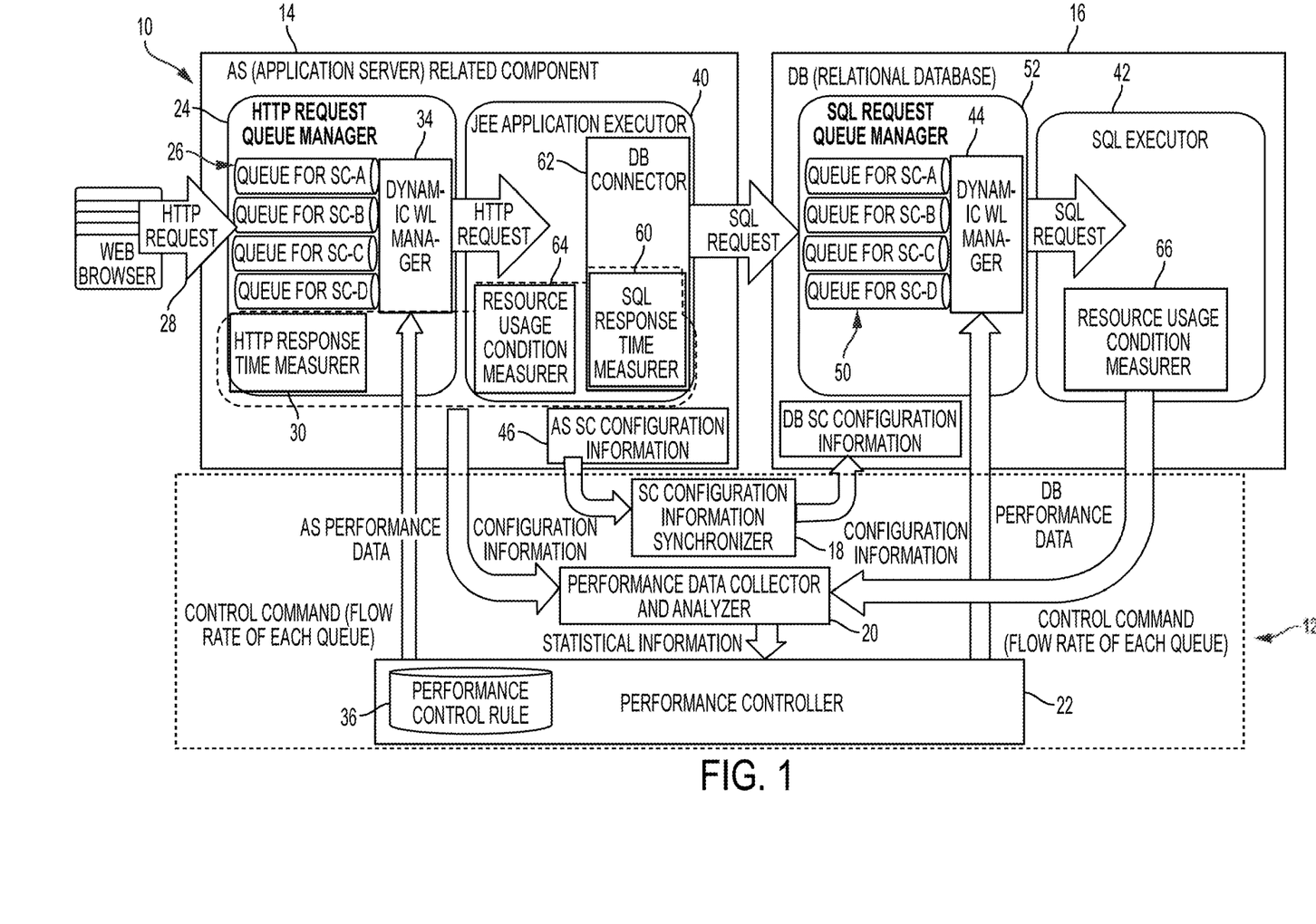
FIG. 1 is a schematic of a performance adjuster according to the present invention.

Referring to the figures, wherein like numerals refer to like parts throughout, there is seen in FIG. 1 a WEB-RDB system 10 having a performance adjuster 12 according to the present invention. Performance adjuster 12 is used to autonomously configure both an application server 14 and a relational database 16. As seen in FIG. 1, performance adjuster 12 includes a service class (SC) configuration information synchronizer 18, a performance data collector and analyzer 20, and a performance controller 22 coupled between application server 14 and a relational database 16. As in known in the art, application server 14 may include an HTTP request queue manager 24, sometimes referred to as an on-demand router. HTTP request queue manager 24 has a queue 26 for HTTP requests 28 in each service class and performs the function of dynamically changing the flow rate of each queue 24. The service class in application server 14 is associated with part of Web application or URL (a context, a route, etc.) and includes a target response time tracked by an HTTP response time measurer 30 to deliver priority in compliance with the predetermined response time.

Server class configuration information is stored in the application server 14 and immediately reflected in the service class configuration information in relational database 16 by SC configuration information synchronizer 18. When there are changes during operation of system 10, in a similar manner, the SC configuration information items in application server 14 and relational database 16 are immediately updated by SC configuration information synchronizer 18.

Dynamic creation of queue 24 for each service class by HTTP request queue manager 24 in application server 14 is dynamically and automatically created in a dynamic workload manager 34 in relational database 16. Queue 24 is not only created dynamically and automatically, but is also added or deleted in accordance with contents of an update of the server class configuration information when the update is performed. Because the function is made as a component independent of application server 14 and relational database 16, due to provision of proper interfaces in application server 14 and relational database 16 sides, the function becomes available to multiple system combinations.

Application server 14 is able to obtain an HTTP response time from HTTP request queue manager 24, an SQL response time from a JEE application executor 40 in application server 14, and a resource usage condition from JEE application executor 40. The resource refers to a CPU and a memory. Relational database 16 is able to obtain a resource usage condition from an SQL executor 42 of relational database 16. The resource refers to a CPU, a memory and a disk.

Performance data collector and analyzer 20 collects performance data items from both of application server 14 and relational database 16 on a regular basis to compile and calculate the data items in each service class.

Performance controller 22 obtains the performance data items compiled in each service class from performance data collector and analyzer 20. Performance controller 22 has a predefined performance control rule 36 stored inside thereof, and based on the rule, provides directions to dynamic workload manager 34 in application server 14 and dynamic workload manager 44 of relational database 16 to reset the flow rate (the number of requests to be processed per unit time) of each queue 24.

Because there is no need to configure application server 14 and relational database 16 separately, configuration is simplified. Based on definition of the service class, performance control including not only application server 14, but also relational database 16, becomes available.

Figure 2:
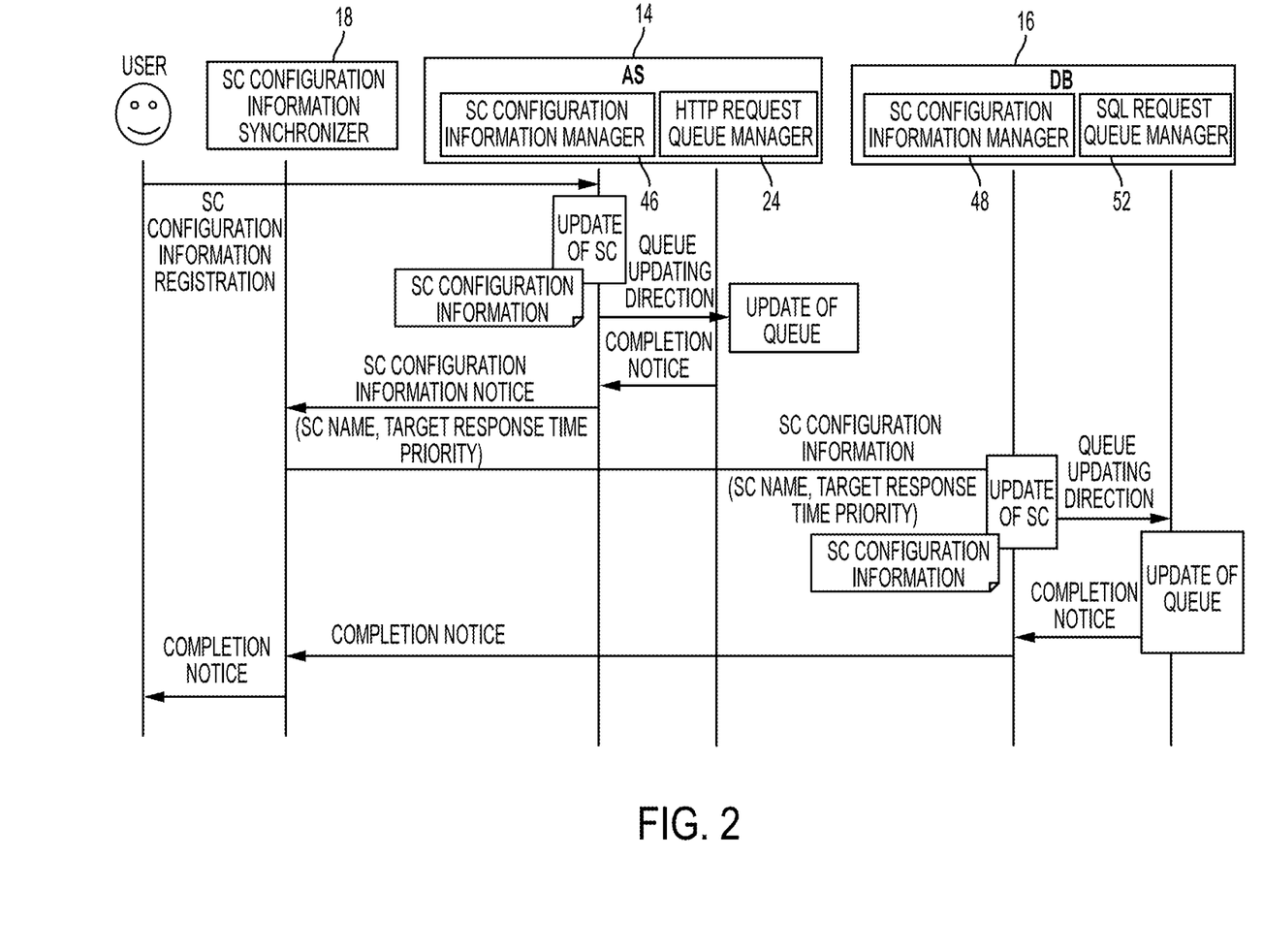
FIG. 2 is a schematic of a configuration information synchronizer according to the present invention.

Referring to FIG. 2, a user registers service class configuration information to the SC configuration information manager 46 in application server 14. Upon reception of the SC configuration information from the user, SC configuration information manager 46 updates the SC configuration information in application server 14 and instructs HTTP request queue manager 24 to create or delete queue 26. Upon reception of an instruction to update queue 26, HTTP request queue manager 24 creates or deletes queue 26 and transmits the SC configuration information to the SC configuration information manager 46 along with a completion notice. SC configuration information manager 46 transmits the updated SC configuration information to SC configuration information synchronizer 18. Upon reception of the SC configuration information from application server 14, SC configuration information synchronizer 18 transmits the SC configuration information to a SC configuration information manager 48 of relational database 16. SC configuration information manager 48 in relational database 16 updates, based on the received SC information, the SC configuration information used in relational database 16, and transmits an instruction for updating queue 50 to SQL request queue manager 52. Upon completion of update of the SC configuration information and queue 50 in relational database 16, a completion notice is transmitted to synchronizer 18 and the user. Update of the queue in relational database 16 is done during operation of relational database 16. The service class in application server 14 and the service class in relational database 16 are 1:1 in the default condition. Similarly, queue 26 in application server 14 and the queue 52 in relational database 16 are 1:1 in the default condition.

Figure 3:
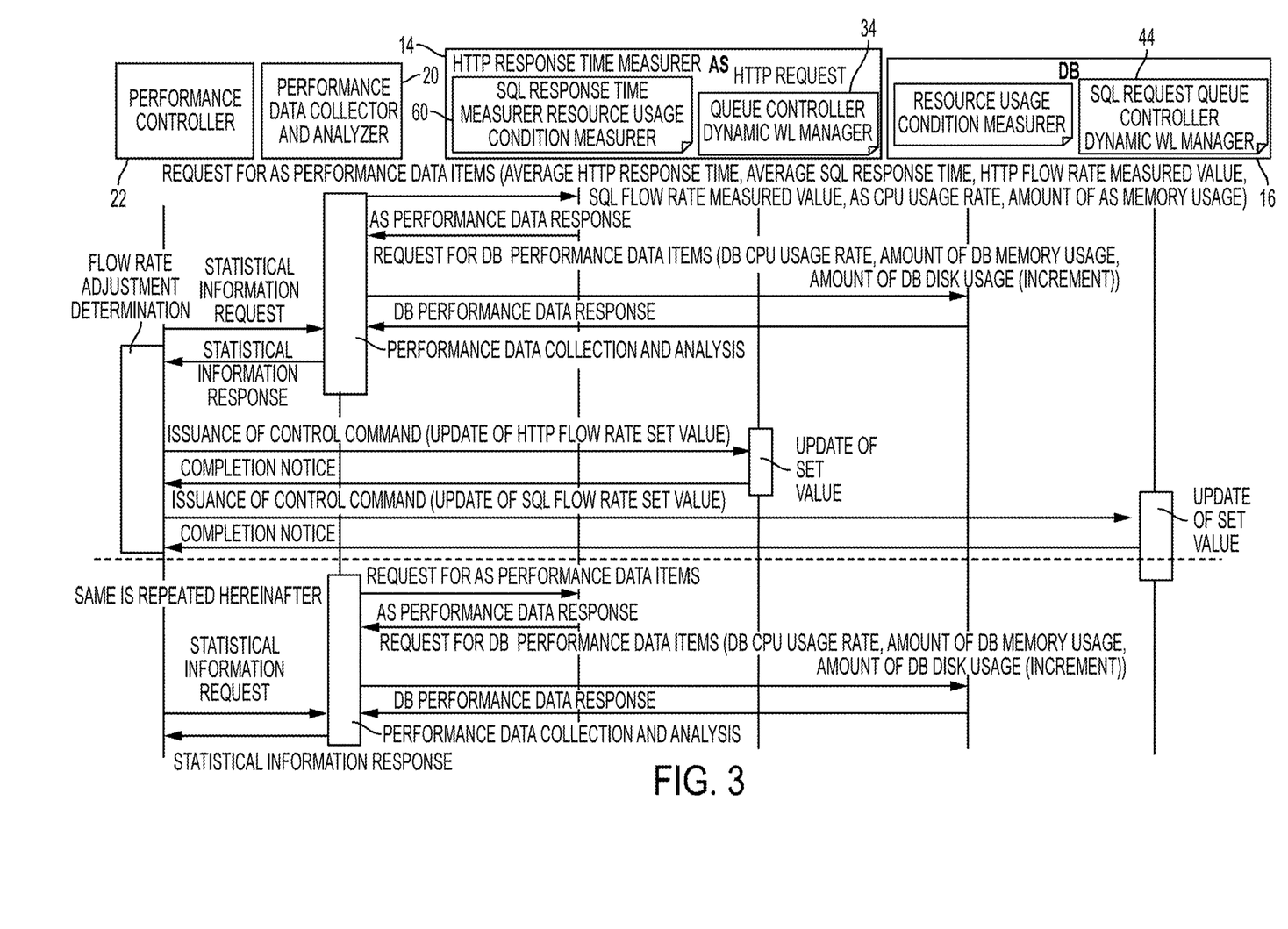
FIG. 3 is a schematic of a performance controller according to the present invention.

Referring to FIG. 3, performance data collector and analyzer 20 sends a request for application server performance data items to application server 14, i.e., data from HTTP response time measurer 30, SQL response time measurer 60 of a database connector 62, and a resource usage condition measurer 64 of JEE application executor 40. Performance data from HTTP response time measurer 30, SQL response time measurer 60, and resource usage condition measurer 64 is then sent from application server 14 back to performance data collector and analyzer 20. Similarly, performance data collector and analyzer 20 also sends a request for database performance data to resource usage condition measurer 66 of SQL executor 42 of relational database 16. Resource usage condition measurer 66 then sends database performance data back to performance data collector and analyzer 20. Performance controller 22 sends a request for statistical information on performance data to performance data collector and analyzer 20. Performance data collector and analyzer 20 then sends statistical information obtained by analysis of performance data to the performance controller 22. Performance controller 22 compares the statistical information in the performance data with any predefined target response time and priority, determines the necessity for flow rate adjustment, and calculates the HTTP or SQL flow rate set value if it is determined that any adjustment is needed. If it is determined that the HTTP flow rate needs to be adjusted, performance controller 22 sends a command for updating the HTTP flow rate set value to dynamic workload manager 44 of HTTP request queue manager 24. Similarly, if it is determined that the SQL flow rate needs to be adjusted, performance controller 22 sends a command for updating the SQL flow rate set value to dynamic workload manager 44 of SQL request queue manager 52. This flow is repeated at predetermined time intervals and involves, as needed, repeated adjustment of the HTTP or SQL flow rate.

Figure 4:
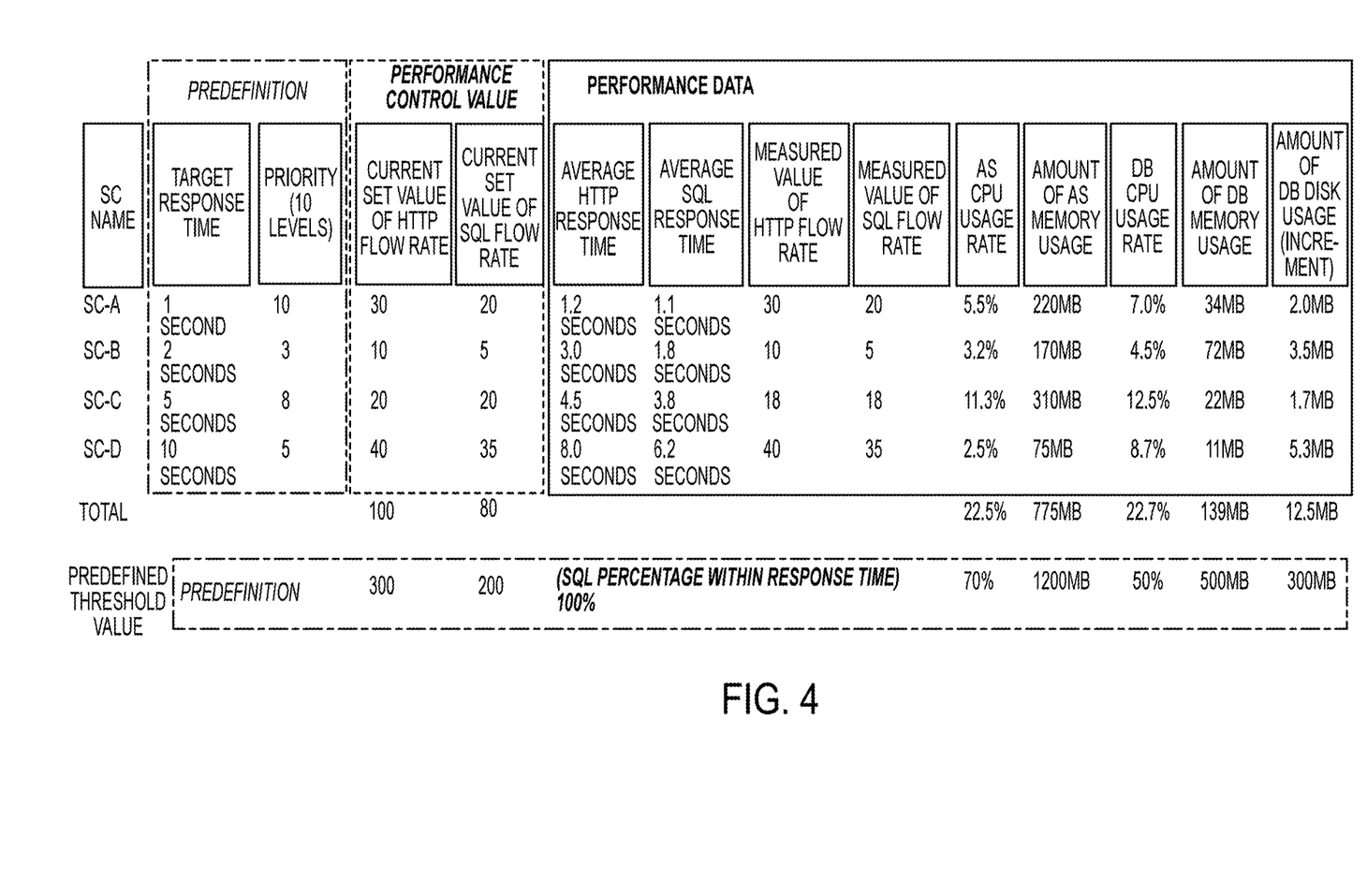
FIG. 4 is a chart of performance data items obtained at regular intervals from a performance data collector and analyzer according to the present invention.

Performance data items are obtained at regular intervals from performance data collector and analyzer 20. An example of the performance data items is shown in FIG. 4 in a tabular form. The performance data items are compared with predefined values, and based on a predefined performance control rule, performance control values are determined so that control commands may be transmitted to dynamic workload manager 34 of the application server 14 and dynamic workload manager 44 of relational database 16. Among the performance data items, the average HTTP response time is of particular interest. The average HTTP response time of SC-A and SC-B in the example of FIG. 4 exceed the corresponding predefined target response time. Among these two service classes, SC-A, which has higher priority, is to undergo adjustment. The fact that the average SQL response time of SC-A is greater than the target response time indicates the necessity for adjustment of the DB performance (100% of the target response time is used for the comparison here, although a certain percentage of the target response time may be used as a predefined threshold value for the comparison). The amount of usage of the DB resource in SC-A (the CPU usage rate, the amount of DB memory usage, and the amount of incremental DB disk usage) is divided by the SQL flow rate measured value to determine the amount of usage for each SQL request. Since the current set value of SQL flow rate is 20, the amount of resource usage in the case of an SQL flow rate set value of 21, which is obtained by incrementing the current value by one, is calculated to make sure that it does not exceed predefined threshold values (for example 50%, 500 MB, and 300 MB). If it exceeds the threshold values, the process jumps to a reduction flow mode as described below. Accordingly, a control command for setting the SQL flow rate set value for SC-A to 21 is sent to dynamic workload manager 44 of SQL request queue manager 52. This flow is repeated at predetermined time intervals and involves, as needed, repeated steps of increasing the flow rate to a preferred value for each service class. Similarly, if it is determined that the HTTP flow rate, instead of the SQL flow rate, is to be incremented, a control command is sent to dynamic workload manager 34 of HTTP request queue manager 24.

Even after adjustment of the flow rate of SC-A is determined to be needed, the adjustment is sometimes impossible because the SQL flow rate exceeds the predefined thresholds after being increased. When the adjustment is impossible, a reduction in the flow rate is determined to be needed and then executed in the following manner as a reduction flow mode. Among the performance data items, of interest in this mode is the average HTTP response time. The average HTTP response time of SC-C and SC-D each do not exceed the corresponding predefined target response time. Among these two serviced classes, SC-D, which has lower priority, is to be subjected to flow rate reduction. The fact that the average SQL response time of SC-D is smaller than the target response time shows that adjustment of the DB performance is not necessarily needed (100% of the target response time is used for the comparison here, although a certain percentage of the target response time may be used as a predefined threshold value for the comparison). Accordingly, the flow rate on the AS side is reduced. Because the current set value of HTTP flow rate is 40, it is decremented by one to be 39. Accordingly, a control command for setting the HTTP flow rate set value for the SC-D to 39 is sent to dynamic workload manager 34 of HTTP request queue controller 24.

Figure 5:
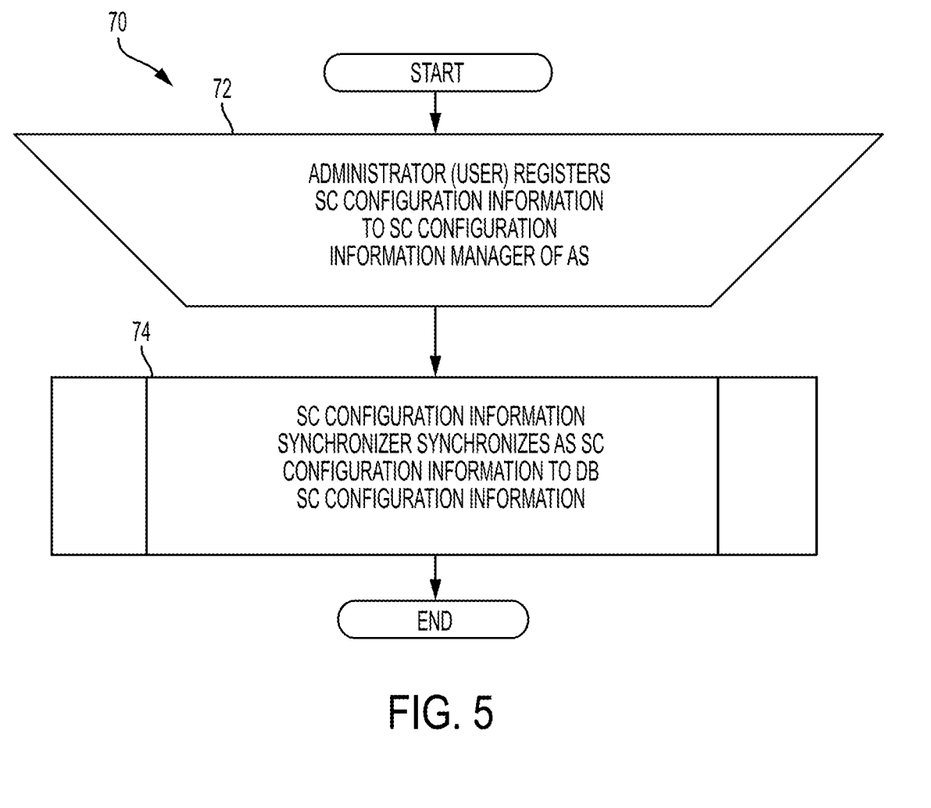
FIG. 5 is a high level flowchart of a process implemented by a performance adjuster according to the present invention.
Figure 6:
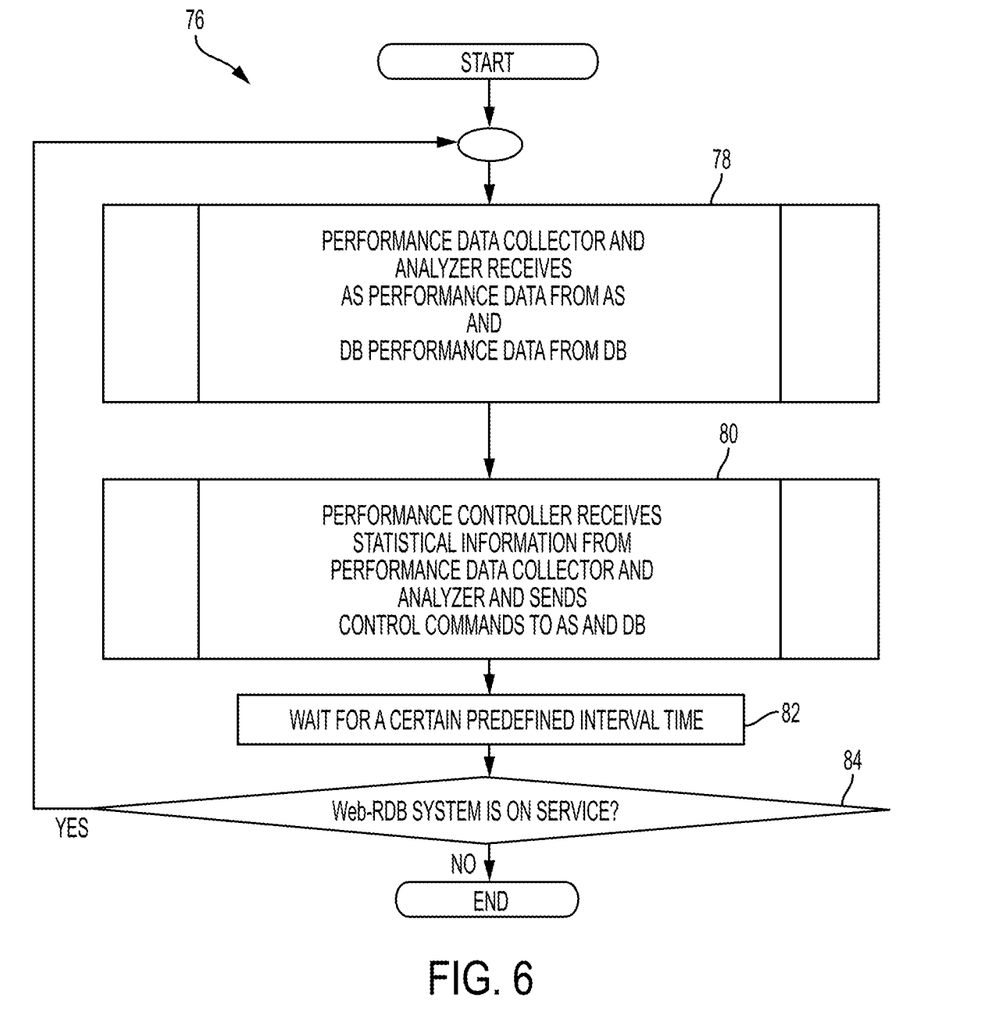
FIG. 6 is a flowchart of a performance data collection and control process according to the present invention.

Referring to FIG. 5, system 10 implements a process 70 beginning with a user registering service class confirmation information 72. Next, configuration information is synchronized 74 between application server 14 and relational database 16. As further seen in FIG. 6, system 10 also implements a process 76 where performance data collector and analyzer 20 receives performance data 78 from application server 14 and relational database 16, receives statistical data 80 from performance data collector and analyzer 20 and sends control commands to application server 14 and relational database 16. After a predetermined wait 82, a check 84 is performed to determine whether system 10 is on service. If so, control returns to the beginning of process 76 and, if not, process 76 ends.

Figure 7:
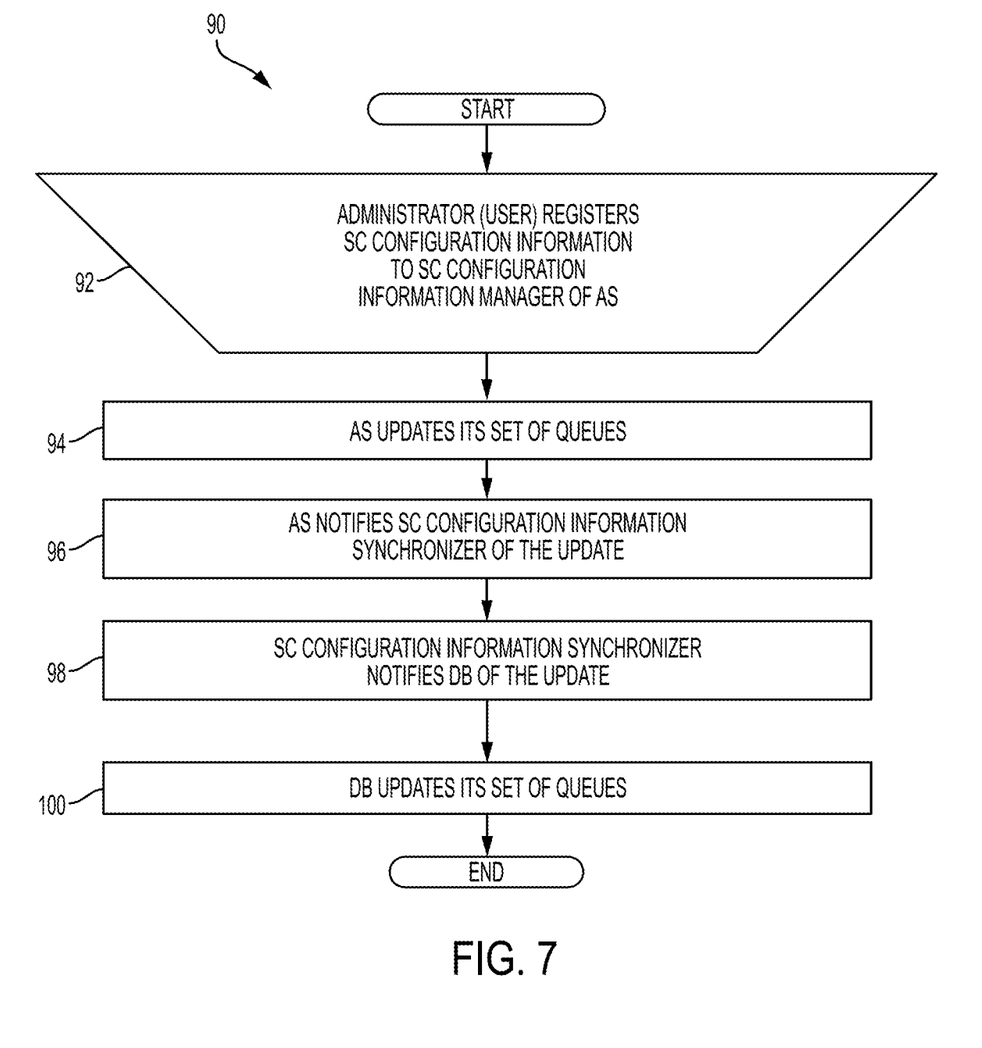
FIG. 7 is a flowchart of a configuration information update process according to the present invention.

Referring to FIG. 7, configuration information synchronizer 18 implements a process 90 that commences with a user registering configuration information 92 via configuration information manager 46 of application server 14. Application server 14 next updates 94 its set of queues 26 and then notifies synchronizer 18 of the update 96. Synchronizer 98 then updates relational database 16 of the update 98 and relational database 16 updates 100 its set of queues 26.

Figure 8:
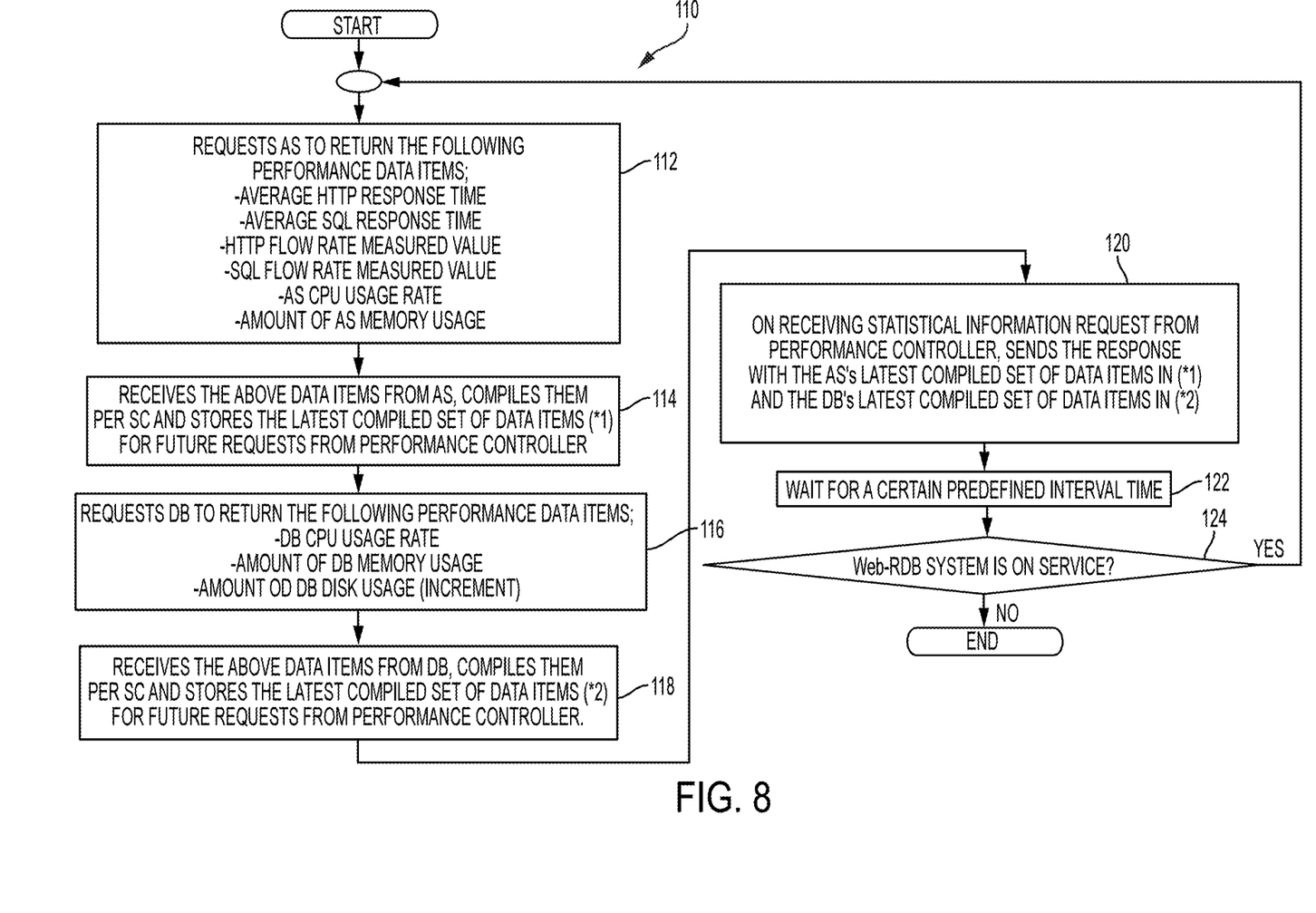
FIG. 8 is a flowchart of a performance data collection process according to the present invention.

Referring to FIG. 8, performance data collector and analyzer 20 implements a process 110 beginning with a request that application server 14 return performance data items 112. These data items are received, compiled and stored 114 for future retrieval in response a request from performance controller 22. A request is also made for relational database 16 to return performance data items 116. These data items are received, compiled and stored 118 for future retrieval in response a request from performance controller 22. Upon receipt of a request from performance controller 22, the compiled and stored data is provided in a response 120. Process 110 then waits for a predetermined time 122 and then performs a check 124 to see whether system 10 is on service. If so, control returns to the start. If not, process 110 ends.

Figure 9:
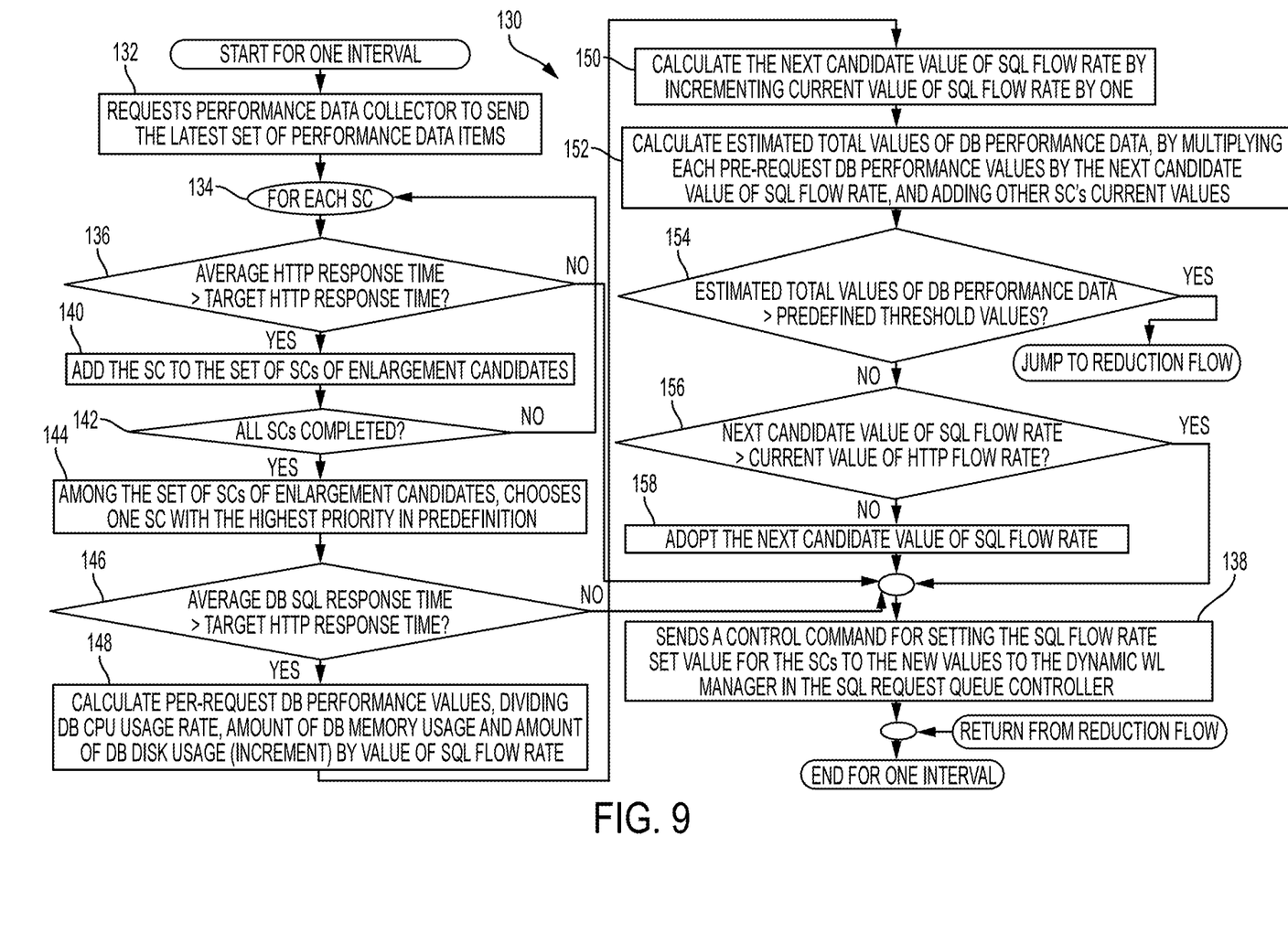
FIG. 9 is a flowchart of a performance data control process according to the present invention.

Referring to FIG. 9, performance controller 22 implements a process 130 beginning with a request to performance data collector and analyzer 20 to provide performance data items 132. For each service class 134, a check 136 is made to determine whether the average HTTP response time is greater than the target HTTP response time. If check 136 is not met, a control command 138 is sent to the dynamic workload manager 34 of SQL request queue manager 24 to set the SQL flow rate set value for the service class to a new value. If check 136 is met, the service classes are added to the set of service class enlargement candidates 140. A check 142 is then performed to determined whether all services classes are complete. If not, control returns to check 136. If check 142 is met, the service class with the highest predetermined priority is selected 144. A check 146 is then performed to determine whether the average SQL response time is greater than the target HTTP response time. If not, control passes to block 138. If so, per-request database performance values are calculated 148 by dividing the database CPU usage rate, the amount of database memory usage, and the amount of incremental database disk usage by the value of the SQL flow rate. The next candidate value of SQL flow rate is then calculated by incrementing the current SQL flow rate by one 150. The estimated total values of database performance data are then calculated 152 by multiplying each pre-request database performance value by the next candidate value of SQL flow rate and adding other service class current values. A check 154 is then made to determine whether the estimated total values of database performance data is greater than predetermined threshold values. If so, control passes to a reduction flow process 170 described herein. If so, a check 156 is performed to determine whether the next candidate value of the SQL flow rate is greater than the current value of the HTTP flow rate. If so, control passes to block 138. If not, the next candidate value of the SQL flow rate is adopted 158 and control passes to block 138. Process 130 then ends for one interval.

Figure 10:
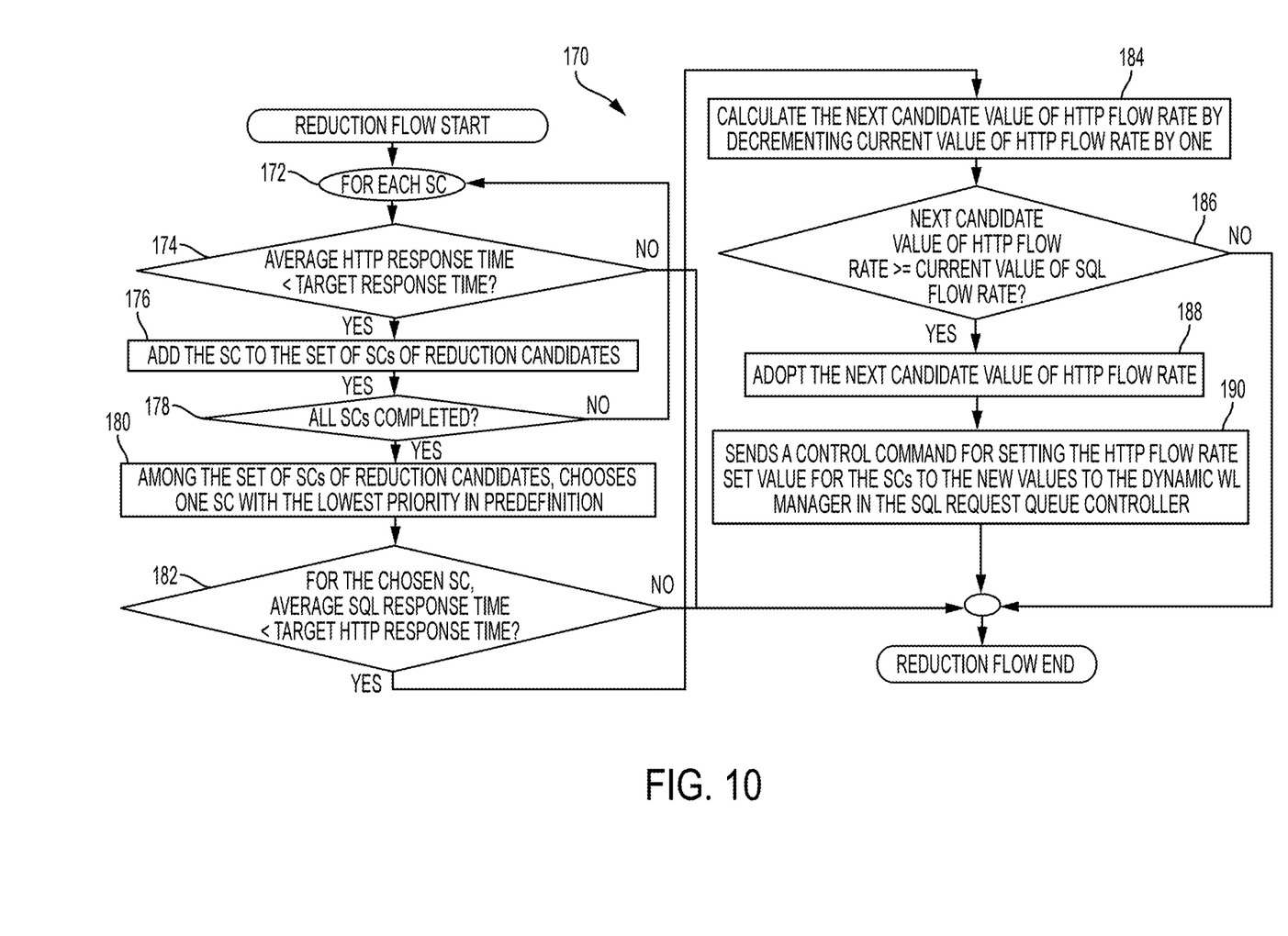
FIG. 10 is a flowchart of a performance data evaluation process according to the present invention.

Referring to FIG. 10, performance controller 22 implements a reduction flow process 170 that, for each serviced class 172 begins with a check 174 whether the average HTTP response time is less than a target response time. If not, process 170 ends. If so, the service class is added to the set of service classes of reduction candidates 176. A check 178 is made to determine whether all service classes have been completed. If not, control returns to block 172. If so, one service class with the lowest predetermined priority is chosen among the set of reduction candidates 180. A check 182 is then performed to determine whether the average SQL response time is less than a target HTTP response time. If not, process 170 ends. If so, the next candidate value of HTTP flow rate is calculated by decrementing the current value of the HTTP flow rate by one 184. A check 186 is then performed to determine whether the next candidate value of the HTTP flow rate is greater than or equal to the current value of the SQL flow rate. If not, process 170 ends. If so, the next candidate value of the HTTP flow rate is adopted 188. A control command is then sent 190 to dynamic workload manager 44 of SQL request queue manager 52 to set the HTTP flow rate value to the new value.

The descriptions of the various embodiments of the present invention have been presented for the purposes of illustration, but are not intended to be exhaustive or limited to the embodiments disclosed. Many modification and variations will be apparent to those of ordinary skill in the art without departing from the scope and spirit of the described embodiments. The terminology used herein was chosen to best explain the principles of the embodiments, the practical application or technical improvement over the technologies found in the market place, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A performance adjuster for a system having an application server and a relational database, comprising:
 a service class configuration information synchronizer coupled between the application server and the relational database and configured to update the relational database with server class configuration information stored in the application server;
 a performance data collector and analyzer coupled between the application server and the relational database and configured to collect application server performance data comprising HTTP response times from the application server and relational database performance data comprising SQL response times from the relational database;
 a performance controller coupled between the application server and the relational database and to the performance data collector and analyzer, wherein the performance controller is configured to obtain the collected performance data from the performance data collector and analyzer and to change flow rates in the application server and the relational database based on least in part on the HTTP response times and the SQL response times if the collected performance data does not meet a predetermined threshold.

2. The performance adjuster of claim 1, wherein the service class configuration information synchronizer is in communication with an application server service class configuration manager of the application server and with a relational database service class configuration manager of the relational database.

3. The performance adjuster of claim 2, wherein the application server includes an application server service class configuration information manager configured to update configuration information in the application server in response to the service class configuration information synchronizer and the relational database includes a relational database service class configuration information manager configured to update configuration information in the relational database in response to the service class configuration information synchronizer.

4. The performance adjuster of claim 3, wherein the application server further includes a HTTP request queue manager that updates an application server queue in response to configuration information received from the service class configuration information synchronizer.

5. The performance adjuster of claim 4, wherein the application server further includes a SQL request queue manager that updates a relational database queue in response to configuration information received from the service class configuration information synchronizer.

6. A method of adjusting the performance of a system having an application server and a relational database, comprising:
coupling a service class configuration information synchronizer between the application server and the relational database;
using the service class configuration information synchronizer to update the relational database with server class configuration information stored in the application server;
coupling a performance data collector and analyzer between the application server and the relational database;
collecting application server performance data comprising HTTP response times from the application server and relational database performance data comprising SQL response times from the relational database;
coupling a performance controller between the application server and the relational database and to the performance data collector and analyzer;
using the performance controller to obtain the collected performance data from the performance data collector and analyzer; and
changing flow rates in the application server and the relational database based on least in part on the HTTP response times and the SQL response times if the collected performance data from the performance data collector and analyzer does not meet a predetermined threshold.

7. The method of claim 6, wherein coupling of the service class configuration information synchronizer comprises placing the service class configuration information synchronizer in communication with an application server service class configuration manager of the application server and with a relational database service class configuration manager of the relational database.

8. The method of claim 7, further comprising including an application server service class configuration information manager in the application server that is configured to update configuration information in the application server in response to the service class configuration information synchronizer and including a relational database service class configuration information manager in the relational database that is configured to update configuration information in the relational database in response to the service class configuration information synchronizer.

9. The method of claim 8, further comprising including a HTTP request queue manager that updates an application server queue in the application server that is configured to response to configuration information received from the service class configuration information synchronizer.

10. The method of claim 9, further comprising including an SQL request queue manager in the relational database that is configured to update a relational database queue in response to configuration information received from the service class configuration information synchronizer.

11. The method of claim 10, wherein changing flow rates in the application server and the relational database if the collected performance data from the performance data collector and analyzer does not meet a predetermined threshold comprises determining whether HTTP response times and SQL response times are sufficient.

12. A computer program product for adjusting the performance of a system having an application server and a relational database, the computer program product comprising a computer readable storage medium having program instructions embodied therewith, the program instructions executable by a computing device to cause the computing device to:
couple a service class configuration information synchronizer between the application server and the relational database;
use the service class configuration information synchronizer to update the relational database with server class configuration information stored in the application server;
couple a performance data collector and analyzer between the application server and the relational database;
collect application server performance data comprising HTTP response times from the application server and relational database performance data comprising SQL response times from the relational database;
couple a performance controller between the application server and the relational database and to the performance data collector and analyzer;
use the performance controller to obtain the collected performance data from the performance data collector and analyzer; and
change flow rates in the application server and the relational database based on least in part on the HTTP response times and the SQL response times if the collected performance data from the performance data collector and analyzer does not meet a predetermined threshold.

13. The computer program product of claim 12, wherein the application server includes an application server service class configuration information manager configured to update configuration information in the application server in response to the service class configuration information synchronizer and the relational database includes a relational database service class configuration information manager configured to update configuration information in the relational database in response to the service class configuration information synchronizer.

14. The computer program product of claim 13, wherein the service class configuration information synchronizer is in communication with an application server service class configuration manager of the application server and with a relational database service class configuration manager of the relational database.

15. The computer program product of claim 14, wherein the application server includes an application server service class configuration information manager that is configured to update configuration information in the application server in response to the service class configuration information synchronizer and the relational database includes a relational database service class configuration information manager that is configured to update configuration information in the relational database in response to the service class configuration information synchronizer.

16. The computer program product of claim 15, further comprising an HTTP request queue manager that updates an application server queue in the application server that is configured to response to configuration information received from the service class configuration information synchronizer.

17. The computer program product of claim 16, further comprising an SQL request queue manager in the relational database that is configured to update a relational database queue in response to configuration information received from the service class configuration information synchronizer.

18. The computer program product of claim 17, wherein changing flow rates in the application server and the relational database if the collected performance data from the performance data collector and analyzer does not meet a predetermined threshold comprises determining whether HTTP response times and SQL response times are sufficient.

* * * * *